(12) United States Patent
Kataoka et al.

(10) Patent No.: US 9,395,255 B2
(45) Date of Patent: Jul. 19, 2016

(54) ON-VEHICLE DETECTOR

(71) Applicants: Hitachi Metals, Ltd., Tokyo (JP);
JTEKT CORPORATION, Osaka-shi (JP)

(72) Inventors: Yuta Kataoka, Hitachi (JP); Kensaku Hotta, Kashihara (JP)

(73) Assignees: HITACHI METALS, LTD., Tokyo (JP);
JTEKT CORPORATION, Osaka-shi, Osaka (JP)

( * ) Notice: Subject to any disclaimer, the term of this patent is extended or adjusted under 35 U.S.C. 154(b) by 49 days.

(21) Appl. No.: 14/522,460

(22) Filed: Oct. 23, 2014

(65) Prior Publication Data
US 2015/0114139 A1   Apr. 30, 2015

(30) Foreign Application Priority Data
Oct. 24, 2013 (JP) ................................. 2013-220883

(51) Int. Cl.
*G01L 3/02* (2006.01)
*G01L 3/10* (2006.01)
*B62D 6/10* (2006.01)
*B62D 15/02* (2006.01)
*G01D 5/14* (2006.01)

(52) U.S. Cl.
CPC . *G01L 3/104* (2013.01); *B62D 6/10* (2013.01); *B62D 15/0215* (2013.01); *G01D 5/145* (2013.01)

(58) Field of Classification Search
CPC .................................. G01L 3/104; B62D 6/10
USPC ........................ 73/862.193, 862.331–862.335
See application file for complete search history.

(56) References Cited

U.S. PATENT DOCUMENTS

| 7,201,070 | B2 * | 4/2007 | Tokumoto | B62D 6/10 73/862.328 |
| 8,534,141 | B2 | 9/2013 | Maehara | |
| 2003/0062890 | A1 * | 4/2003 | Tokumoto | B62D 6/10 324/207.25 |
| 2005/0172732 | A1 * | 8/2005 | Feng | G01D 5/145 73/862.332 |
| 2009/0211374 | A1 | 8/2009 | Oike et al. | |
| 2011/0088488 | A1 | 4/2011 | Maehara | |
| 2012/0118078 | A1 * | 5/2012 | Chen | B25B 23/14 73/862.21 |

FOREIGN PATENT DOCUMENTS

| EP | 1 300 662 A2 | 4/2003 |
| EP | 1 845 352 A1 | 10/2007 |
| JP | 2011-88507 | 5/2011 |

OTHER PUBLICATIONS

Extended European Search Report dated Apr. 9, 2015.

* cited by examiner

*Primary Examiner* — Max Noori
(74) *Attorney, Agent, or Firm* — McGinn IP Law Group PLLC

(57) ABSTRACT

An on-vehicle detector includes a torque detecting portion for magnetically detecting a torque transmitted to a rotating shaft rotated by steering operation, and a rotation detecting portion for magnetically detecting a rotation of the rotating shaft. The rotation detecting portion includes a magnet with a pair of magnetic poles and a magnetic detection element, the magnet being disposed on a side of the rotating shaft so as to rotate simultaneously with the rotating shaft and the magnetic detection element being disposed on a side of the rotating shaft to detect a change in magnetic flux density caused by the magnet approaching or moving away in accordance with the rotation of the rotating shaft. The magnet is disposed such that the pair of magnetic poles is aligned along a circumferential direction of the rotating shaft.

13 Claims, 4 Drawing Sheets

2 TORQUE DETECTING PORTION
3 ROTATION DETECTING PORTION

ON-VEHICLE DETECTOR

The present application is based on Japanese patent application No. 2013-220883 filed on Oct. 24, 2013, the entire contents of which are incorporated herein by reference.

BACKGROUND OF THE INVENTION

1. Field of the Invention

The invention relates to an on-vehicle detector for detecting a torque applied to a rotating shaft of a vehicle and detecting the number of rotations of the rotating shaft.

2. Description of the Related Art

Some on-vehicle detectors for detecting torque applied to a steering column (rotating shaft) of a vehicle and detecting the origin position (the number of rotations) of the rotating shaft are known (see e.g. JP-A-2011-88507).

The on-vehicle detector disclosed in JP-A-2011-88507 is equipped with a torque sensor (torque detecting portion) for magnetically detecting torque applied to the steering column and a position sensor (rotation detecting portion) for magnetically detecting rotation of the steering column.

The torque sensor includes a cylindrical torque-detecting permanent magnet arranged to surround the steering column, a torque-detecting magnetic sensor capable of detecting magnetic flux density and a magnetic circuit for conducting magnetic flux formed by the torque-detecting permanent magnet to the magnetic sensor. The magnetic circuit is configured so that the magnetic flux density detected by the magnetic sensor changes according to a twist angle of a torsion bar which is twisted by torque applied to the steering column.

The position sensor includes a position-detecting permanent magnet having a pair of magnetic poles which are formed along a radial direction of the steering column, a resin magnet-holding member for fixing the position-detecting permanent magnet to the steering column, a position-detecting magnetic sensor for detecting whether the position-detecting permanent magnet is situated at a predetermined position in a rotating direction of the steering column and a resin sensor holder for holding the magnetic sensor. Then, a magnet-side yoke is held by the magnet-holding member and a detecting yoke is held by the sensor holder.

The magnet-side yoke and the detecting yoke are magnetically connected when the position-detecting permanent magnet is moved to a predetermined position due to rotation of the steering column, and magnetic flux of the position-detecting permanent magnet is then guided to the position-detecting magnetic sensor by the magnet-side yoke and the detecting yoke. Thus, it is possible to magnetically detect the rotation of the steering column based on change in output signal from the magnetic sensor.

In addition, since the magnet-side yoke is interposed between the position-detecting permanent magnet and the torque sensor in this on-vehicle detector, magnetic interference between the torque sensor and the position sensor is suppressed by a magnetic screening effect of the magnet-side yoke.

SUMMARY OF THE INVENTION

In the on-vehicle detector disclosed in JP-A-2011-88507, however, since the position-detecting permanent magnet is arranged so that the pair of magnetic poles thereof is located along the radial direction of the steering column, the magnet-side yoke and the detecting yoke extend in the radial direction of the steering column and this causes the size of the on-vehicle detector at a portion of the position sensor to be increased in the radial direction of the steering column. In addition, since it is necessary to hold the magnet-side yoke by the magnet-holding member and the detecting yoke by the sensor holder, the number of components and assembly man-hours are increased.

It is an object of the invention to provide an on-vehicle detector that can be downsized while preventing the magnetic flux interference from the rotation detecting portion to the torque detecting portion.

According to one embodiment of the invention, an on-vehicle detector comprises:

a torque detecting portion for magnetically detecting a torque transmitted to a rotating shaft rotated by steering operation; and a rotation detecting portion for magnetically detecting a rotation of the rotating shaft, wherein the rotation detecting portion comprises a magnet with a pair of magnetic poles and a magnetic detection element, the magnet being disposed on a side of the rotating shaft so as to rotate simultaneously with the rotating shaft and the magnetic detection element being disposed on a side of the rotating shaft to detect a change in magnetic flux density caused by the magnet approaching or moving away in accordance with the rotation of the rotating shaft, and wherein the magnet is disposed such that the pair of magnetic poles is aligned along a circumferential direction of the rotating shaft.

Effects of the Invention

According to one embodiment of the invention, an on-vehicle detector can be provided that that can be downsized while preventing the magnetic flux interference from the rotation detecting portion to the torque detecting portion.

BRIEF DESCRIPTION OF THE DRAWINGS

Next, the present invention will be explained in more detail in conjunction with appended drawings, wherein:

FIGS. 2A and 2B are explanatory diagrams illustrating the operation of a torque detecting portion, wherein FIG. 2A is a perspective view showing a state in which a torsion bar is not twisted and FIG. 2B is a perspective view showing a state in which the torsion bar is twisted;

FIGS. 3A to 3C are explanatory diagrams illustrating the operation of a rotation detecting portion, wherein FIG. 3A is a cross sectional view showing a state in which a rotation-detecting magnet is located the closest to a magnetic detection element, FIG. 3B is a cross sectional view showing a state in which the rotation-detecting magnet is at a distance from the magnetic detection element and FIG. 3C is a graph showing a waveform of output voltage of the magnetic detection element.

DETAILED DESCRIPTION OF THE PREFERRED EMBODIMENTS

First Embodiment

Figure 1:
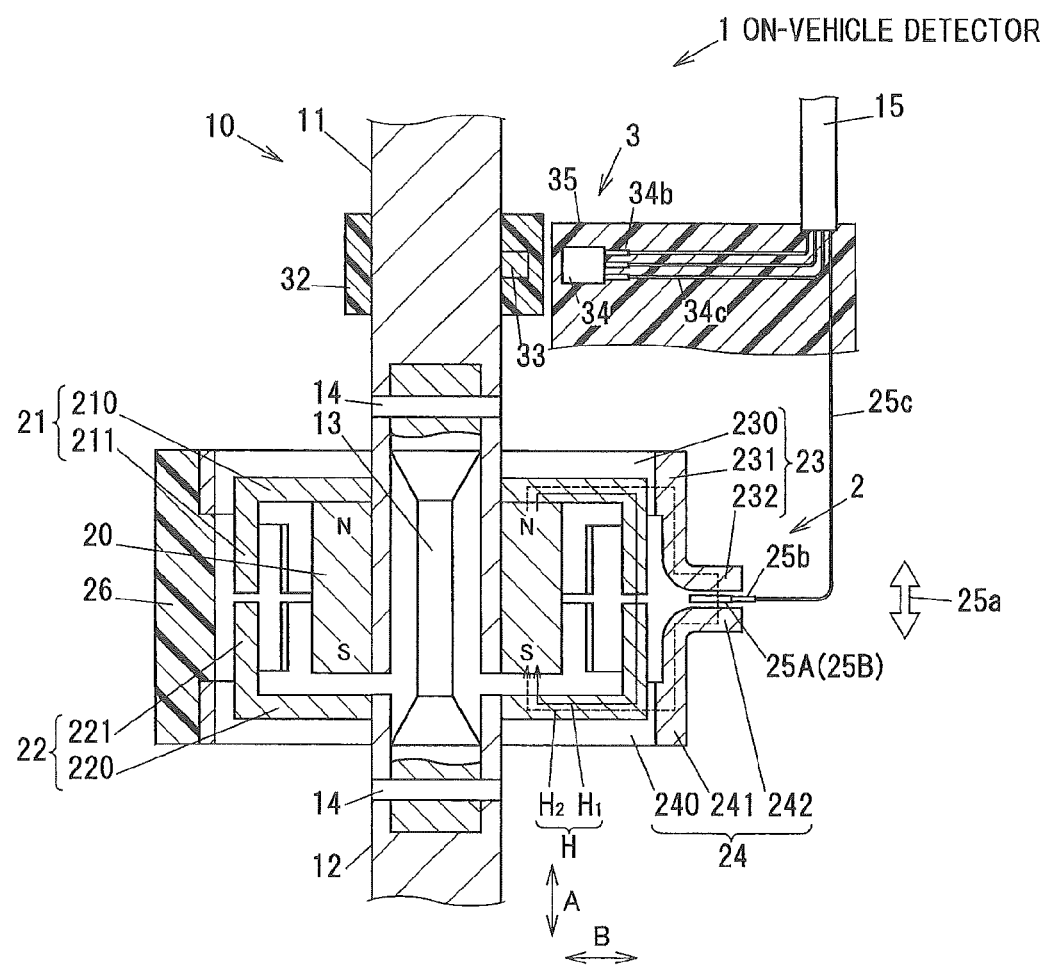
FIG. 1 is a schematic cross sectional view showing a configuration example of an on-vehicle detector in a first embodiment of the present invention.

FIG. 1 is a schematic cross sectional view showing a configuration example of an on-vehicle detector in the first embodiment of the invention. Here, a direction parallel to a steering column will be called "axial direction A" and a direction orthogonal to the steering column will be called "radial direction B".

An on-vehicle detector 1 is provided with a torque detecting portion 2 and a rotation detecting portion 3. The torque detecting portion 2 magnetically detects steering torque which is received by a steering column 10 as a rotating shaft rotated by steering operation of a steering wheel, and the rotation detecting portion 3 magnetically detects rotation of the steering column 10. An electrically-assisted power steering system (not shown) for assisting steering operation is provided on a steering system of a vehicle, and assist torque for assisting an electric motor of the electrically-assisted power steering system to steer the wheels is output according to steering torque and the number of rotations of the steering column (the direction of the wheels) which are detected by the on-vehicle detector 1.

The steering column 10 is connected to the steering wheel, is provided with an input shaft 11 receiving an input of a steering force, an output shaft 12 connected to the electrically-assisted power steering system and a torsion bar 13 coupling the input shaft 11 to the output shaft 12, and is rotatably supported inside a non-illustrated column housing. The input shaft 11, the output shaft 12 and the torsion bar 13 are formed of a magnetic material such as iron-based metal. An end portion of the torsion bar 13 on the steering wheel side is relatively non-rotatably fixed to the input shaft 11 by a pin 14 and another end portion is relatively non-rotatably fixed to the output shaft 12 by another pin 14.

Configuration of Torque Detecting Portion 2

The torque detecting portion 2 is provided with a cylindrical torque-detecting magnet 20 fixed to the input shaft 11 so as to surround the input shaft 11, an annular first rotating yoke 21 fixed to the input shaft 11, an annular second rotating yoke 22 fixed to the output shaft 12, a first fixed yoke 23 arranged on the outer side of the first rotating yoke 21 with a gap therebetween, a second fixed yoke 24 arranged on the outer side of the second rotating yoke 22 with a gap therebetween, a first magnetic detection element 25A and a second magnetic detection element 25B (only the first magnetic detection element 25A is shown in FIG. 1) arranged between the first fixed yoke 23 and the second fixed yoke 24, and a holding member 26 formed of a molding resin to hold the first and second fixed yokes 23 and 24.

The first and second fixed yokes 23 and 24, the first and second magnetic detection elements 25A and 25B and the holding member 26 are fixed to a vehicle body via the column housing.

The torque-detecting magnet 20 has a pair of magnetic poles (N-pole and S-pole) at end portions in the axial direction A of the steering column 10. In the first embodiment, the torque-detecting magnet 20 is a permanent magnet having an N-pole on the upper side of FIG. 1 and an S-pole on the lower side. As the torque-detecting magnet 20, it is possible to use, e.g., ferrite magnets and neodymium magnets, etc.

In the first embodiment, the first and second magnetic detection elements 25A and 25B using hall elements are arranged so that a detection direction 25a to detect magnetic flux density is opposite to each other. Due to this arrangement, influences of temperature characteristics and detection sensitivity in the axial direction A offset against each other and detection accuracy of the on-vehicle detector 1 is increased.

An electric wire 25c is connected to terminals 25b of the first and second magnetic detection elements 25A and 25B.

Configuration of Rotation Detecting Portion 3

The rotation detecting portion 3 is provided with a rotation-detecting magnet 33 arrange on a side of the input shaft 11 so as to rotate integrally with the input shaft 11, a holding member 32 formed of a non-magnetic material, e.g., mold resin, etc., to hold the rotation-detecting magnet 33 on the input shaft 11, and a magnetic detection element 34 arranged on a side of the input shaft 11 to detect a change in magnetic flux density caused by the rotation-detecting magnet 33 approaching or moving away in accordance with rotation of the input shaft 11. Here, "side" means the radially outside.

The rotation-detecting magnet 33 is arranged so that a pair of magnetic poles thereof is aligned along a circumferential direction of the input shaft 11. In more detail, the rotation-detecting magnet 33 has a pair of magnetic poles at end portions in a direction orthogonal to the radial direction B of the input shaft 11 as viewed on the cross section taken orthogonal to the input shaft 11. In the first embodiment, the rotation-detecting magnet 33 is permanent magnet having an N-pole on the far side of FIG. 1 and an S-pole on the near side, and is arranged in contact with the outer peripheral surface of the steering column 10. As the rotation-detecting magnet 33, it is possible to use, e.g., ferrite magnets and neodymium magnets, etc.

A detection direction of the magnetic detection element 34 to detect magnetic flux density is a direction along the circumferential direction of the input shaft 11. In other words, the detection direction of the magnetic detection element 34 to detect magnetic flux density is a direction parallel to an alignment direction of a pair of magnetic poles of the rotation-detecting magnet 33 at the moment where the rotation-detecting magnet 33 is located the closest to the magnetic detection element 34.

Electric wires 34c are respectively connected to plural terminals 34b of the magnetic detection element 34. Together with the electric wire 25c connected to the first and second magnetic detection elements 25A and 25B of the torque detecting portion 2, the electric wires 34c are housed in a corrugated tube 15. An end portion of the corrugated tube 15, the electric wires 34c led out of the corrugated tube 15 and the magnetic detection element 34, together with the first and second magnetic detection elements 25A and 25B of the torque detecting portion 2, are molded with a mold resin 35. The mold resin 35 is fixed to a vehicle body via the column housing.

To a control section of the electrically-assisted power steering system, output signals from the magnetic detection element 34 of the rotation detecting portion 3 are transmitted via the electric wires 34c and detection signals from the first and second magnetic detection elements 25A and 25B of the torque detecting portion 2 are transmitted via the electric wire 25c. The control section of the electrically-assisted power steering system controls the electric motor based on those signals and applies assist torque to the output shaft 12 to assist steering operation of driver.

As the magnetic detection element 34, it is possible to use, e.g., a Hall element. Alternatively, another magnetic detection element such as MR element, GIG element or GMR element may be used as the magnetic detection element 34.

Operation of Torque Detecting Portion 2

Figure 2A:
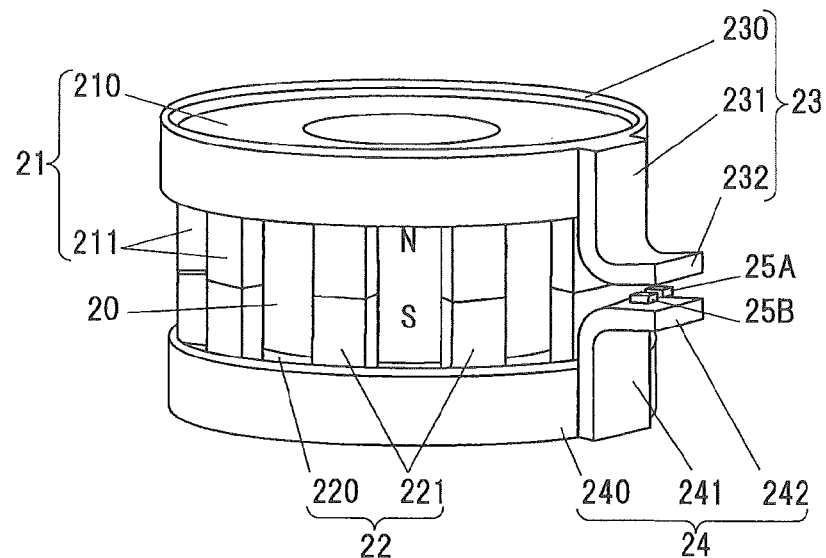
Figure 2B:
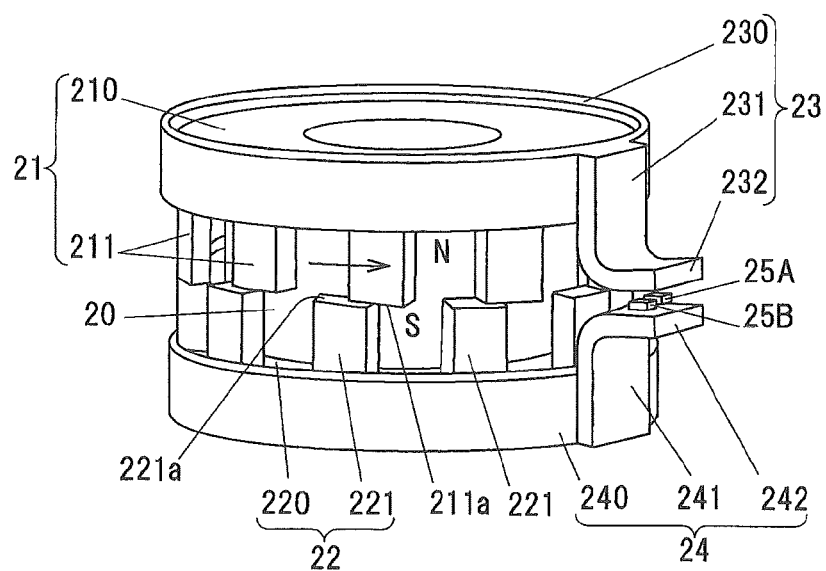

FIGS. 2A and 2B are explanatory diagrams illustrating the operation of a torque detecting portion, wherein FIG. 2A is a perspective view showing a state in which the torsion bar 13 is not twisted and FIG. 2B is a perspective view showing a state in which the torsion bar 13 is twisted.

As shown in FIG. 2A, the first rotating yoke 21 has integrally an annular main body 210 and plural (ten in the first embodiment) protruding portions 211 protruding from the main body 210 in the axial direction A. Likewise, the second rotating yoke 22 has integrally an annular main body 220 and plural protruding portions 221 (the same number as the protruding portions 211 of the first rotating yoke 21) protruding from the main body 220 in the axial direction A.

The first fixed yoke 23 has integrally an annular portion 230 of which an inner surface faces the main body 210 of the first rotating yoke 21 in the radial direction B, an extended portion 231 extending from the annular portion 230 in the axial direction A and a protruding portion 232 protruding outward from an end portion of the extended portion 231 (protruding in a direction of separating from the torsion bar 13). Likewise, the second fixed yoke 24 has integrally an annular portion 240 of which an inner surface faces the main body 220 of the second rotating yoke 22 in the radial direction B, an extended portion 241 extending from the annular portion 240 in the axial direction A and a protruding portion 242 protruding outward from an end portion of the extended portion 241.

As shown in FIG. 1, a magnetic circuit in the torque detecting portion 2 is formed of a magnetic path H composed a first magnetic path $H_1$ and a second magnetic path $H_2$. The first magnetic path $H_1$ is formed by the torque-detecting magnet 20 and the first and second rotating yokes 21 and 22. The second magnetic path $H_2$ is formed by the torque-detecting magnet 20, the main bodies 210 and 220 of the first and second rotating yokes 21 and 22 and the first and second fixed yokes 23 and 24.

When torque acts on the input shaft 11 and the torsion bar 13 is twisted, the first rotating yoke 21 is relatively displaced with respect to the second rotating yoke 22 according to the twist and this causes a decrease in an area of an end surface 211a of the protruding portion 211 of the first rotating yoke 21 facing an end surface 221a of the protruding portion 221 of the second rotating yoke 22, as shown in FIG. 2B. This causes an increase in magnetic reluctance in the first magnetic path $H_1$ shown in FIG. 1 and a resulting decrease in density of magnetic flux flowing through the first magnetic path $H_1$. Magnetic reluctance in the second magnetic path $H_2$ shown in FIG. 1 is constant regardless of presence of torque acting on the input shaft 11. Therefore, magnetic flux density of the second magnetic path $H_2$ increases with the decrease in the magnetic flux density of the first magnetic path $H_1$.

This allows the first and second magnetic detection elements 25A and 25B to detect the amount of twist of the torsion bar 13, i.e., a steering force (steering torque) transmitted from the input shaft 11 to the output shaft 12, as a change in the magnetic flux density of the second magnetic path $H_2$.

Operation of Rotation Detecting Portion 3

Figure 3A:
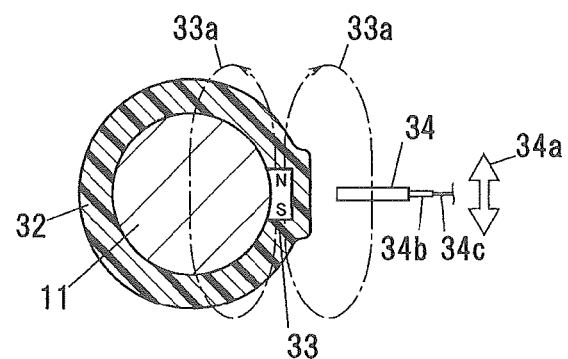
Figure 3B:
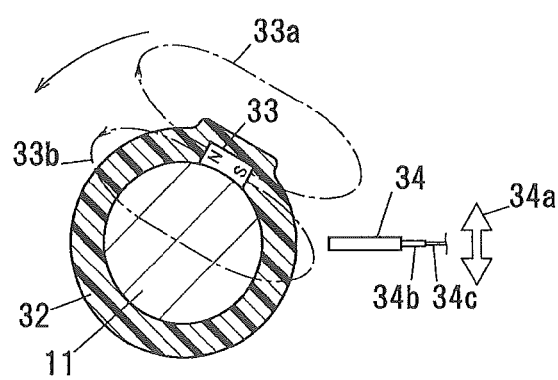
Figure 3C:
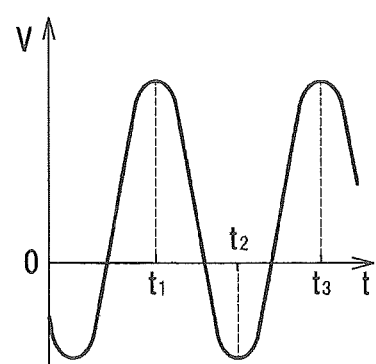

FIGS. 3A to 3C are explanatory diagrams illustrating the operation of the rotation detecting portion 3, wherein FIG. 3A is a cross sectional view showing a state in which the rotation-detecting magnet 33 is located the closest to the magnetic detection element 34, FIG. 3B is a cross sectional view showing a state in which the rotation-detecting magnet 33 is at a distance from the magnetic detection element 34 and FIG. 3C is a graph showing a waveform of output voltage of the magnetic detection element 34 during the steering column 10 is rotating.

In the state in which the rotation-detecting magnet 33 is moved to the closest position to the magnetic detection element 34 as shown in FIG. 3A due to rotation of the steering column 10, magnetic flux 33a emitted from the rotation-detecting magnet 33 passes through the magnetic detection element 34 in a direction orthogonal to the radial direction of the steering column 10 (in the circumferential direction of the steering column 10). The thickness direction of the magnetic detection element 34 coincides with the direction of detecting the magnetic flux density.

In FIGS. 3A and 3B, a detection direction 34a of the magnetic detection element 34 is indicated by a double-headed arrow. The detection direction 34a is a direction along the circumferential direction of the input shaft 11 and output voltage of the magnetic detection element 34 changes according to density of magnetic flux which passes through the magnetic detection element 34 along the detection direction 34a. In the first embodiment, a direction of magnetic flux passing through the magnetic detection element 34 when the rotation-detecting magnet 33 is located the closest to the magnetic detection element 34 is defined as a forward direction, and the magnetic detection element 34 is arranged so that output voltage thereof is positive voltage. When the magnetic flux passes in the reverse direction which is opposite to the forward direction, the magnetic detection element 34 outputs negative voltage. In FIGS. 3A and 3B, the main path of the magnetic flux emitted from the rotation-detecting magnet 33 is shown as the magnetic flux 33a and is indicated by a dash-dot line.

When the rotation-detecting magnet 33 moves away from the magnetic detection element 34 due to rotation of the steering column 10 from the position shown in FIG. 3A in an arrow direction shown in FIG. 3B, the magnetic flux of the rotation-detecting magnet 33 passing through the magnetic detection element 34 decreases. Then, when the rotation-detecting magnet 33 is positioned on the opposite side to the magnetic detection element 34 with the steering column 10 interposed therebetween due to further rotation of the steering column 10, the direction of the magnetic flux passing through the magnetic detection element 34 is reversed.

In FIG. 3C, the horizontal axis indicates time t and the vertical axis indicates output voltage v of the magnetic detection element 34.

The output voltage v of the magnetic detection element 34 becomes the positive maximum value at times $t_1$ and $t_3$ at which the rotation-detecting magnet 33 is located the closest to the magnetic detection element 34, and becomes the negative maximum value at time $t_2$ at which the rotation-detecting magnet 33 is the farthest from the magnetic detection element 34. This allows the control section of the electrically-assisted power steering system to detect one rotation of the steering column 10 when the output voltage v of the magnetic detection element 34 becomes, e.g., the positive maximum value or when a zero-crossing where the positive or negative sign is reversed is detected.

Functions and Effects of the First Embodiment

The Following Functions and Effects are Obtained in the First Embodiment (1) Since the alignment direction of the pair of magnetic poles of the rotation-detecting magnet 33 is a direction along the circumferential direction of the steering column 10, the magnetic flux emitted from the rotation-detecting magnet 33 is less likely to flow into the torque detecting portion 2. That is, if the alignment direction of the pair of magnetic poles of the rotation-detecting magnet 33 is the radial direction of the steering column 10, the magnetic flux emitted from the rotation-detecting magnet 33 largely expands toward the outside of the steering column 10 and is likely to flow into the first and second fixed yokes 23 and 24 of the torque detecting portion 2. However, in the first embodiment, since the alignment direction of the pair of magnetic poles of the rotation-detecting magnet 33 is the direction along the circumferential direction of the steering column 10, inflow of the magnetic flux into the first and second fixed yokes 23 and 24 is suppressed. This reduces the influence on torque detection accuracy of the torque detecting portion 2.

(2) Since the inflow of the magnetic flux into the torque detecting portion 2 is suppressed by aligning the pair of magnetic poles of the rotation-detecting magnet 33 along the circumferential direction of the steering column 10, it is possible to arrange the rotation detecting portion 3 close to the torque detecting portion 2 while suppressing the influence of the magnetic flux of the rotation-detecting magnet 33 on torque detection accuracy of the torque detecting portion 2. Thus, it is possible to downsize the on-vehicle detector 1.

(3) Since the detection direction of the magnetic detection element 34 to detect magnetic flux density is the direction along the circumferential direction of the steering column 10 and coincides with the thickness direction of the magnetic detection element 34, it is possible to arrange the magnetic detection element 34 so that, e.g., the terminals 34b extend in the radial direction of the steering column 10 as shown in FIG. 1. This allows the magnetic detection element 34 to be arranged in the mold resin 35 without bending the terminals 34b and it is possible to simplify the manufacturing process and also to suppress cracks, etc., on the mold resin 35. If the pair of magnetic poles is arranged along, e.g., the radial direction of the steering column 10, it is necessary to bend the terminals 34b so that the thickness direction of the magnetic detection element 34 coincides with the radial direction of the steering column 10 and this increases the manufacturing man-hours and makes the mold resin 35 likely to be damaged. However, the arrangement of the rotation-detecting magnet 33 and the magnetic detection element 34 in the first embodiment allows such problems to be avoided.

Second Embodiment

Figure 4:
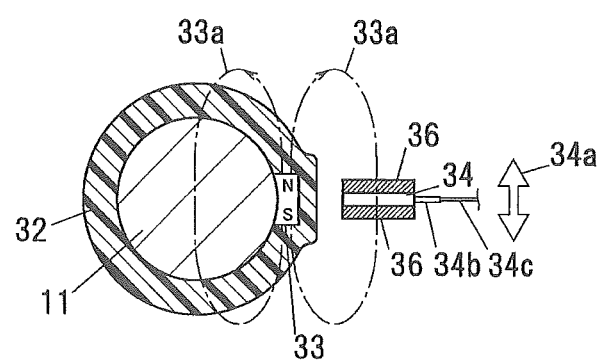
FIG. 4 is a cross sectional view showing a configuration example of an on-vehicle detector in a second embodiment of the invention.

FIG. 4 is a cross sectional view showing a configuration example of an on-vehicle detector in the second embodiment of the invention. In the second embodiment, a pair of magnetic members 36 arranged on both sides of the magnetic detection element 34 is added to the first embodiment and the remaining configuration is the same as the first embodiment.

The magnetic member 36 is formed of a magnetic material, e.g., plate-like iron or permalloy, etc. The size of the magnetic member 36 is preferably equal to or more than that of the detecting portion of the magnetic detection element 34.

The pair of magnetic members 36 is arranged along a magnetic flux density detection direction of the magnetic detection element 34 so as to sandwich the magnetic detection element 34 in the thickness direction thereof. Although the pair of magnetic members 36 in the second embodiment is directly in contact with the magnetic detection element 34, gaps may be formed between the pair of magnetic members 36 and the magnetic detection element 34 and a portion of the mold resin 35 may be present in such gaps.

According to the second embodiment, in addition to the functions and effects of the first embodiment, the magnetic flux emitted from the rotation-detecting magnet 33 can be actively conducted to the magnetic detection element 34 by the pair of magnetic members 36 and it is thus possible to increase detection accuracy of the rotation detecting portion 3.

SUMMARY OF THE EMBODIMENTS

Technical ideas understood from the embodiments will be described below citing the reference numerals, etc., used for the embodiments. However, each reference numeral, etc., described below is not intended to limit the constituent elements in the claims to the members, etc., specifically described in the embodiments.

[1] An on-vehicle detector (1), comprising: a torque detecting portion (2) for magnetically detecting a torque transmitted to a rotating shaft (10) rotated by steering operation; and a rotation detecting portion (3) for magnetically detecting a rotation of the rotating shaft (10), wherein the rotation detecting portion (3) comprises a magnet (33) with a pair of magnetic poles and a magnetic detection element (34), the magnet (33) being disposed on a side of the rotating shaft (10) so as to rotate simultaneously with the rotating shaft (10) and the magnetic detection element (34) being disposed on a side of the rotating shaft (10) to detect a change in magnetic flux density caused by the magnet (33) approaching or moving away in accordance with the rotation of the rotating shaft (10), and the magnet (33) is disposed such that the pair of magnetic poles is aligned along a circumferential direction of the rotating shaft (10).

[2] The on-vehicle detector (1) described in the [1], wherein the magnetic detection element (34) comprises a detection direction (34a) of the magnetic flux density along the circumferential direction of the rotating shaft (10).

[3] The on-vehicle detector (1) described in the [2], further comprising a pair of magnetic, members (36) on both sides of the magnetic detection element (34) along the detection direction (34a).

Although the embodiments of the invention have been described, the invention according to claims is not to be limited to the embodiments. Further, all combinations of the features described in the embodiments are not necessary to solve the problem of the invention.

For example, although the rotation-detecting magnet 33 is in contact with the input shaft 11 in each of the embodiments, the rotation-detecting magnet 33 may be arranged so that a gap is provided between itself and the input shaft 11.

In addition, a shielding member for shielding the magnetic flux emitted from the rotation-detecting magnet 33 may be arranged between the torque detecting portion 2 and the rotation detecting portion 3.

What is claimed is:
1. An on-vehicle detector, comprising:
a torque detecting portion for magnetically detecting a torque transmitted to a rotating shaft rotated by a steering operation; and
a rotation detecting portion juxtaposed with the torque detecting portion in an axial direction of the rotating shaft for magnetically detecting a rotation of the rotating shaft,
wherein the rotation detecting portion comprises a magnet with a pair of magnetic poles and a magnetic detection element, the magnet being disposed on a side of the rotating shaft so as to rotate simultaneously with the rotating shaft and the magnetic detection element being disposed on the side of the rotating shaft to detect a change in a magnetic flux density caused by the magnet approaching or moving away in accordance with the rotation of the rotating shaft, and wherein the magnet is disposed at a region of a circumferential direction of the rotating shaft and the magnet is consisted of an N-pole at one end and an S-pole at another end in the circumferential direction.

2. The on-vehicle detector according to claim 1, wherein the magnetic detection element comprises a detection direction of the magnetic flux density along the circumferential direction of the rotating shaft.

3. The on-vehicle detector according to claim 2, further comprising a pair of magnetic members positioned on both sides of the magnetic detection element along the detection direction.

4. The on-vehicle detector according to claim 1, wherein the torque detecting portion and the rotation detecting portion are provided separately from each other.

5. The on-vehicle detector according to claim 1, wherein the pair of magnetic poles is disposed at end portions of the magnet in a direction orthogonal to a radial direction of the rotating shaft as viewed on a cross section taken orthogonal to the rotating shaft.

6. The on-vehicle detector according to claim 1, wherein the magnet is arranged in contact with an outer peripheral surface of the rotating shaft.

7. The on-vehicle detector according to claim 1, wherein a detection direction of the magnetic detection element to detect a magnetic flux density comprises a direction parallel to an alignment direction of the pair of magnetic poles of the magnet.

8. The on-vehicle detector according to claim 1, wherein a detection direction of the magnetic detection element to detect a magnetic flux density comprises a direction parallel to an alignment direction of the pair of magnetic poles of the magnet at a moment where the magnet is located closest to the magnetic detection element.

9. The on-vehicle detector according to claim 1, wherein the rotation detecting portion further comprises a holding member comprising a non-magnetic material to hold the magnet on the rotating shaft.

10. The on-vehicle detector according to claim 1, wherein the rotating shaft includes an input shaft for receiving an input of a steering force, an output shaft connected to an electrically-assisted power steering system and a torsion bar coupling the input shaft to the output shaft, and wherein the torque detecting portion comprises:
a cylindrical torque-detecting magnet attached to the input shaft to surround the input shaft; and
an annular first rotating yoke attached to the input shaft.

11. The on-vehicle detector according to claim 10, wherein the torque detecting portion further comprises:
an annular second rotating yoke attached to the output shaft; and
a first fixed yoke arranged on an outer side of the first rotating yoke with a gap therebetween.

12. The on-vehicle detector according to claim 11, wherein the torque detecting portion further comprises:
a second fixed yoke arranged on an outer side of the second rotating yoke with a gap therebetween;
a first magnetic detection element and a second magnetic detection element arranged between the first fixed yoke and the second fixed yoke; and
a holding member comprising a molding resin to hold the first and second fixed yokes.

13. The on-vehicle detector according to claim 12, wherein an end portion of the torsion bar is attached to the input shaft by a first pin and another end portion of the torsion bar is attached to the output shaft by a second pin.

\* \* \* \* \*